United States Patent Office 2,706,178
Patented Apr. 12, 1955

2,706,178

PREPARATION OF HYDRATED PERBORATE PRODUCTS

James H. Young, Niagara Falls, N. Y., assignor to E. I. du Pont de Nemours and Company, Wilmington, Del., a corporation of Delaware No Drawing. Application February 10, 1951, Serial No. 210,431

16 Claims. (Cl. 252—99)

This invention relates to the preparation of perborate products having properties which make them especially well suited for packaging purposes.

Crystalline sodium perborate tetrahydrate, $$NaBO_3.4H_2O$$

is well-known commercially. If pure, it melts at 62 to 63° C. At temperatures of 40 to 50° C., it has a pronounced vapor pressure as shown by the following vapor pressure values: 10.4 mm. at 25° C., 24.6 mm. at 35° C., 33 mm. at 40° C. and 50.8 mm. at 45° C. The moist environment produced by this high vapor pressure accelerates decomposition with loss of active oxygen. Therefore, for good storage stability, this compound or blends containing it, must be stored at temperatures which are lower than temperatures frequently encountered in warehouses or freight cars.

Sodium perborate tetrahydrate is but slightly soluble in cold water. It is commonly prepared by a crystallization process as described in Carveth Patent 1,716,874. The process requires carefully selected raw materials, preferably purified, and the addition of a suitable stabilizer in order to prepare a product of reasonable stability. The crystals recovered generally range in size from about 30 to 150 mesh with a major fraction smaller than 100 mesh.

Young Patent 2,491,789 describes a method for preparing sodium perborates containing less water, more active oxygen and having a lower $Na_2O:B_2O_3$ ratio than the above tetrahydrate. When dry such perborates are unusually stable even at temperatures of 50 to 60° C. However, they absorb water rapidly and tend to cake and decompose in a moist atmosphere.

Sodium perborate tetrahydrate does not cake in moist environments as readily as does the Young product referred to above. However, its relative instability under humid conditions at temperatures of around 40° C. and higher due to its high vapor pressure, and the fact that mechanical mixtures thereof with solid blending agents do not remain homogeneous due to particle segregation are serious handicaps to its use in solid compositions for packaging. On the other hand, the tendency of product of the type described in Patent 2,491,789 to cake and finally decompose in moisture atmospheres militates against its use for similar purposes. Moreover, when preparing solid mixtures using either type of perborate, the diluents employed introduce impurities which catalyze decomposition of the perborate, especially under moist conditions, which decomposition accentuates caking.

One object of this invention is to provide a method for producing perborates having improved properties. A further object is to provide a method of producing perborates having improved properties for packaging purposes. A still further object is a method for hydrating and granulating non-hydrated perborates, particularly those of the type described in Young Patent 2,491,789, and for controlling the size of the resulting granules. Still further objects will be apparent from the following description.

The above objects are accomplished in accordance with this invention by adding water and a "non-hydrated" perborate in controlled amounts and rates to an agitated body of granular preformed "hydrated" perborate and continuing agitation during the hydration reaction. It has been discovered that non-hydrated perborates can be hydrated readily and effectively in this manner to give hydrated products consisting of rounded granules presenting a minimum of surface area, and that the size of the resulting granules can be controlled by controlling the amount of concentrated solution of non-hydrated perborate present in the hydration reaction mixture.

The term "hydrated perborate" is used herein to mean a perborate which contains substantially its maximum amount of combined water, i. e., water present as $H_2O$ and $H_2O_2$ of crystallization. The term "non-hydrated perborate" is used to mean a perborate which contains substantially less combined water than the maximum which it could contain and which will react with water to give a "hydrated perborate." Non-hydrated perborates are thus water-poor or water-deficient with respect to combined water.

The present method can be used to hydrate any perborate containing less than its maximum amount of combined water, i. e., any non-hydrated perborate. It can be used effectively to hydrate and granulate the well-known sodium perborate monohydrate, $NaBO_3.H_2O$. It is especially concerned with and well suited for the hydration and granulation of perborates of the type described in Young Patent 2,491,789 which contain in combined form from 0.53 to 0.97 mole of alkali metal oxide and 0.5 to 2.5 atoms of active oxygen per mole of $B_2O_3$ and not more than 2 moles of water per atom of active oxygen. Perborates in which the $Na_2O:B_2O_3$ ratio is 1 can also be used and the preferred perborates will contain in combined form 0.8 to 1.0 mole $Na_2O$ and 1.8 to 2.2 atoms of active oxygen per mole of $B_2O_3$ and not more than about 1.05 moles of water per atom of active oxygen.

The temperature of the reaction mixture should be below the melting temperature of the hydrated perborate so that the latter will remain granular. It will generally not exceed about 45° C. The preferred range is 20 to 40° C. Temperatures above 45° C. usually result in granules too large for most purposes. Temperatures below 20° C., e. g., 15° C. or lower, can be used but require longer reaction times.

The size of the granules produced by the present method will depend upon the amount of concentrated solution of non-hydrated perborate present in the reaction mixture. In general, the greater the amount of such concentrated solution, the larger will be the size of the granules. The amount of concentrated solution present, and therefore the size of the granules, can be controlled by controlling the amounts of water and non-hydrated perborate added, by controlling the temperature existing in the reaction mixture, or by controlling both of these factors. Increasing such additions or the temperature, or both, increases the amount of concentrated solution present and results in larger granule size. If, however, large amounts of water are added relative to the amounts of non-hydrated perborate added, the resulting solution of non-hydrated perborate will be diluted and granules of small size will result unless other factors favorable to formation of large granules exist.

Although not essential, the water and the non-hydrated perborate usually will be and are preferably added separately to the body of hydrated material. If hydration is effected in an open vessel, some vaporization of water will occur and this should be taken into account in determining the amount of water to be added. Ordinarily, water will be added in an amount at least sufficient to hydrate to approximately the tetrahydrate stage.

The water and non-hydrated perborate may be added continuously or intermittently. Preferably, they are added incrementally between intermediate intervals of agitation sufficient to effect thorough distribution and hydration of the previous increment of non-hydrated perborate. Most preferably, the increments of water and non-hydrated perborate are added separately and alternately while the body of hydrated material to which they are added is agitated for brief intervals between additions. The increments may be added by "dumping" them rapidly into the reaction mass but they are preferably added gradually. If desired, all of the water required may be added initially to form a slurry of hydrated perborate in water, to which slurry the non-hydrated perborate is added at a rate or in such increment sizes as will control the size of the resulting granules. In such a method, the original slurry progresses to a moist solid system as the amount of non-hydrated perborate added becomes equivalent to the water previously added. At this stage the system will be similar to systems in which the water and non-hydrated perborate are added in proportionate increments. Generally, however, it is preferred to add the water incrementally with increment sizes roughly equal to about 1 to 1.5 times the amount stoichiometrically equal to the size of the corresponding increments of non-hydrated perborate.

Ordinarily, the amount of non-hydrated material present at any time in the reaction mass will not exceed the amount of hydrated material present and amounts greater than about 25% generally result in granule sizes too large for most uses. Accordingly, when additions are made incrementally, the increments of non-hydrated perborate preferably will not exceed 25% of the weight of the hydrated mass to which they are added and most preferably will not exceed 10%, e. g., will be about 1 to 10%. Product comprising granules ranging from about 100 mesh or slightly smaller to about 10 mesh or slightly larger will be desired for most purposes. Products containing a preponderance of particles of about 45 to 76 mesh are frequently preferred. Such products can readily be obtained by suitably controlling the conditions noted above which regulate granule size.

Diluent materials such as borax, soda ash, phosphates and the like, and modifying materials such as synthetic detergents, soaps and other materials, may be added as desired along with the water and non-hydrated material to produce composite granules containing the hydrated perborate and the diluent or modifying materials in substantially uniform proportions.

The invention is further illustrated by the following examples.

EXAMPLE 1

300 grams of commercial sodium perborate tetrahydrate was placed in an open one-quart size laboratory kneader type dough mixer of the Baker-Perkins type provided with an outer jacket through which heat-regulating fluid could be passed for controlling temperature. With the kneader running increments of an aqueous hydrogen peroxide solution containing 3.5% $H_2O_2$ by weight and a non-hydrated sodium perborate were added separately. After each increment of peroxide solution there was an interval of 1 to 2 minutes before the corresponding increment of non-hydrated perborate was added, whereas after addition of the latter, an interval of agitation ranging from about 2 to about 4 to 5 minutes followed to permit complete hydration of the added material. After a total of 230 cc. of solution and 320 grams of non-hydrated material had been added, 300 grams of hydrated material was removed from the mixture. The addition of increments was then continued with 15 cc. increments of solution and 20 gram increments of non-hydrated perborate added in about a 5 minute cycle until totals of 605 grams of solution and 820 grams of non-hydrated material had been added. During the run two additional 300 gram portions of product were baled out. Except during the early stage of the run, the temperature was in the range 32 to 40° C. The total product, including the starting tetrahydrate, weighed 1611 grams and the recovery of active oxygen was about 97%. Screen analyses for the starting tetrahydrate and the hydrated product finally remaining in the mixer are shown below as are also the compositions of the starting non-hydrated perborate and the final hydrated product.

*Screen analyses*

|  | Original Tetrahydrate | Final Hydrated Product |
|---|---|---|
| 10–45 mesh, percent | 1.6 | 4.1 |
| 45–76 mesh, percent | 37.3 | 78.0 |
| 76–100 mesh, percent | 19.7 | 12.4 |
| –100 mesh, percent | 41.5 | 5.4 |

*Compositions*

|  | Starting Non-hydrated Perborate | Final Hydrated Product |
|---|---|---|
| $Na_2O$, percent | 20.28 | 20.02 |
| $B_2O_3$, percent | 23.19 | 22.85 |
| $H_2O_2$, percent | 21.57 | 21.67 |
| $H_2O$, percent | 34.96 | 35.46 |
| Ratio, $Na_2O:B_2O_3$ | 0.983 |  |

The $Na_2O:B_2O_3$ ratio and the active oxygen content of the hydrated product will of course depend upon the composition of the starting material. It is preferred that the hydrated perborate have a sodium oxide to $B_2O_3$ ratio of about 1 and an active oxygen content of about 10.0 to 10.4%. Preferably, these values will approximate those for commercial sodium perborate tetrahydrate, i. e., about 1 and 10.1 to 10.2%, respectively. Accordingly, when the starting non-hydrated perborate has a lower $Na_2O:B_2O_3$ ratio than the tetrahydrate, it is preferred that an amount of alkali sufficient to increase the ratio to about 1 be added, e. g., as an aqueous solution, during the hydration operation. Similarly, if the non-hydrated perborate does not contain sufficient active oxygen to yield a hydrated perborate containing about 10.1 to 10.2% active oxygen, it is preferred to add the required supplementary amount of $H_2O_2$ during the hydration. Example 1 illustrates the addition of hydrogen peroxide in this manner. The following example illustrates the addition of both sodium hydroxide and hydrogen peroxide.

EXAMPLE 2

A 3.5% solution of hydrogen peroxide and a second solution containing 7.45 grams NaOH in 500 cc. of water were prepared. 7.5 cc. increments of both solutions were alternated with 20 gram increments of a non-hydrated sodium perborate having a ratio of $Na_2O$ to $B_2O_3$ of 0.98 and an active oxygen content of 15.9%. The over-all procedure was similar to that described in Example 1 except that a slightly longer addition cycle was used. The pH of a 1% solution of the product was 10.03 and the product contained 10.3% active oxygen. Commercial sodium perborate tetrahydrate contains about 10.1 to 10.2% active oxygen and the pH of a 1% solution is about 10.2.

The rate of hydration varies, among other factors, with the $Na_2O:B_2O_3$ ratio; the lower the ratio the slower is the rate. This ratio is indicated, relatively, by the alkalinity of solutions prepared from the non-hydrated perborate. The following example shows the effect of alkalinity on the rate of hydration.

EXAMPLE 3

In runs carried out similarly to that described in Example 1, samples of 6 non-hydrated perborates having different $Na_2O:B_2O_3$ ratios were hydrated. After each run was going smoothly, an approximation was made of the time required for the preceding increment of water to completely hydrate the corresponding perborate increment. Before each run, the pH of a 1% aqueous solution of each non-hydrated perborate was determined. The results are tabulated below.

| Sample | pH | Minutes |
|---|---|---|
| A | 9.61 | 25 |
| B | 9.68 | 15 |
| C | 9.83 | 10 |
| D | 9.93 | 7 |
| E | 9.96 | 5 |
| F | 10.5 | 3 |

EXAMPLE 4

A sample of commercial sodium perborate tetrahydrate was dehydrated to approximately the monohydrate stage by heating in dry air at a temperature beginning at 40° C. and increasing to about 70° C. The dehydrated material contained 15.6% active oxygen as against a theoretical 16.03% for $NaBO_3 \cdot H_2O$. This monohydrate was then hydrated to obtain granular tetrahydrate substantially as described in Example 1.

EXAMPLE 5

In a hydration and granulation run carried out at 32 to 40° C. in a manner similar to that of Example 1, a granular hydrated product was obtained having a granule size distribution as indicated in the screen analyses tabulated below. The run was then continued using 300 grams of this hydrated material as the starting "heel" to which were added increments of 21 cc. of 3.5% $H_2O_2$ solution and 28 grams of the same non-hydrated perborate, instead of the 15 cc. and 20 grams increments added during the earlier part of the run. Operating with these larger increments employing the same time cycle and temperature for a period of 45 minutes, increased substantially the proportion of material larger than 45 mesh size, as indicated below.

|  | Starting Heel | Final Product |
|---|---|---|
| +10 mesh, percent | 6.0 | 50.2 |
| 10–45 mesh, percent | 18.8 | 41.8 |
| 45–76 mesh, percent | 44.4 | 5.3 |
| 75–100 mesh, percent | 24.8 | 1.7 |
| −100 mesh, percent | 6.0 | 1.0 |

EXAMPLE 6

Example 1 was repeated employing increments of 15 cc. of 3.5% $H_2O_2$ solution and 20 grams of the non-hydrated perborate on approximately a 5 minute cycle. During the first part of the run, the temperature was 32 to 40° C. and the granule size distribution of the hydrated product was substantially the same as for the final product of Example 1. During the latter part of the run, the temperature was maintained for a time at about 45° C. During this time, a substantial increase in granule size occurred, the granule size range for the hydrated product being: +10 mesh, 59.0%; 10 to 45 mesh, 37.5%; 45 to 76 mesh, 2.5%; 76 to 100 mesh, 0.5%; and less than 100 mesh, 0.6%. The granule size increased even more sharply at temperatures above 45° C.

EXAMPLE 7

Because the non-hydrated perborates of the above Young patent are usually made without previous purification of the raw materials, it is desirable to add stabilizers during the hydration of such perborates in order to secure hydrated products having good stability when dissolved or stored at high humidities. The stabilizer is conveniently added to the water used in the hydration. Thus, a non-hydrated perborate was hydrated as described in Example 1, employing, however, as the source of water two solutions which were added separately in equal amounts. The first solution was prepared from 88 parts by weight of water, 10 parts 35% $H_2O_2$ solution and 2 parts $MgSO_4.7H_2O$. The second solution was prepared using 94 parts by weight water and 6 parts 42° Bé. sodium silicate solution (containing 10% by weight $Na_2O$, 25% $SiO_2$ and 65% $H_2O$). The stabilizer, magnesium silicate, was formed in situ in the hydration mixture and the final product contained about 1.5% of the stabilizer.

A 2% solution of the resulting stabilized product lost from 2 to 3% of its original active oxygen per hour at 50° C. as compared with losses of from 60 to 70% for unstabilized product prepared in a similar manner. The stabilized product had a shelf life in storage at 40° C. and 96% relative humidity of 50 to 60 days as compared with 5 to 10 days for the unstabilized product. Furthermore, material stabilized as described above has withstood storage at 50° C. in vented containers without objectionable caking or decomposition occurring for periods ranging from 5 to 10 times as long as for corresponding unstabilized product or commercial perborate tetrahydrate.

The present method can be used advantageously to prepare products comprising mixed granules containing hydrated perborate and diluents or other materials. Thus, products consisting of mixed granules have been prepared following the general method of Example 1 employing the salt mixtures indicated below in place of straight non-hydrated perborate as the salt increments. The non-hydrated sodium perborate component of the salt mixtures used was of approximately the same composition as that of the non-hydrated perborate used in Example 1.

| Run | Composition of Salt Mixture Added | Size of Salt Increments* | Size of Water Increments* | Size of Initial "Heel"* |
|---|---|---|---|---|
| A | 40% Non-hydrated perborate... 60% Borax (decahydrate) | 60 | 15 | 300 |
| B | 47% Non-hydrated perborate... 34% Borax (decahydrate) 19% Anhyd. sodium pyrophosphate. | 60 | 30 | 300 |
| C | 47% Non-hydrated perborate... 19% Anhyd. sodium pyrophosphate. 34% Anhyd. sodium sulfate... | 18 | 8 | 300 |
| D | 50% Non-hydrated perborate... 20% Anhyd. sodium pyrophosphate. 30% Anhyd. sodium sesquicarbonate. | 4.5 | 2.5 | 50 |
| E | 52% Non-hydrated perborate... 48% Anhyd. sodium pyrophosphate. | 8 | 5 | 40 |

*In parts by weight.

In all of the above runs, the salt and water increments were added to a "heel" prepared by mixing sodium perborate tetrahydrate and the salt diluents in hydrated forms in such proportions as to give a mixture of approximately the composition expected from the hydration reaction, assuming complete hydration of all salts employed. In each case, the product obtained consisted of mixed granules substantially uniform in composition, which therefore, presented no segregation problem during storage.

For comparative tests to evaluate resistance to caking, the mixtures indicated below were prepared by mechanically mixing together the ingredients shown so as to give mixtures having approximately the same active oxygen content. The caking tests were conducted at 40° C. and 96% relative humidity. A sample was regarded as having become objectionably "caked" when it formed either a wet soggy mass of coalesced particles or when a hard cake formed which did not break up readily by shaking or tapping the container.

|  | Composition of Mixture | Days before objectionable caking |
|---|---|---|
| A | 35% Non-hydrated sodium perborate similar to that used in Example 1. 35% Anhyd. sodium tripolyphosphate 30% Borax (decahydrate) | 4 |
| B | 50% Com. sodium perborate tetrahydrate 25% Anhyd. sodium tripolyphosphate 25% Borax (decahydrate) | 14 |
| C | 50% Hydrated perborate similar to product of Example 1 stabilized with 3.8% sodium silicate. 25% Anhyd. sodium tripolyphosphate 25% Borax (decahydrate) | 36 |

The above data demonstrate that mixtures containing the non-hydrated perborate cake rapidly, whereas mixtures containing the same perborate after it has been hydrated and suitably stabilized by the present method are much more resistant to caking, being more resistant than similar mixtures containing commercial perborate tetrahydrate.

For smooth and rapid hydration, it is desirable and preferred that water be employed in amounts equal to a 10 to 50% excess over that amount theoretically required to hydrate the perborate completely. However, to obtain product having maximum stability against caking and decomposition, it is desirable that the final product contain no free water and that its combined water content (including the $H_2O$ equivalent of the combined $H_2O_2$) be on the order of 0.5 to 5% less than the theoretical amount. Accordingly, it is preferred that an excess of water be employed in the hydration as indicated and that the hydrated product be dried under agitation, e. g., by contacting it with dry heated air, until there is a slight deficiency of combined water. Alternatively, slightly less than the theoretical amount of water can be employed during the hydration, in which case the drying step may be omitted.

The body of hydrated perborate to which the increments of water and non-hydrated perborate are added may be ordinary sodium perborate tetrahydrate but generally should correspond approximately in composition with the desired product. It is preferred to employ a "heel" of hydrated product from a previous run. This is particularly true when preparing products comprising mixed granules.

In preparing mixed hydrated granules, the proportion of perborate to diluent or other material may be varied widely as desired. Ordinarily, it will be desired to obtain products containing at least 10% hydrated perborate, the balance being diluent or other modifying material. For most purposes the perborate content usually will be at least 15% and may range up to as high as about 90%. It is preferred that the diluent or other material be added during the hydration operation as described previously since this results in granules of uniform composition which present no segregation problem. However, granular hydrated perborate prepared by the present method and containing no diluent or other material, can be employed in preparing mechanical mixtures with such materials. Such use of these granular perborates is advantageous since their granule size may be controlled to correspond with the particle size of the materials with which they are to be mixed whereby the segregation problem is eliminated or minimized.

When mixed granules are prepared for laundering, bleaching, cleaning and similar uses, borates such as borax, and alkali metal phosphates, including polyphosphates, e. g., sodium pyrophosphate and sodium tripolyphosphate, are generally preferred as diluents although materials such as soda ash, sodium sulfate, sodium silicate and the like can be used. The diluents may be of the hydrated or anhydrous type. If they are anhydrous and capable of being hydrated under the conditions used, they may be hydrated simultaneously with the non-hydrated perborate. Soaps, synthetic detergents, fluorescent dyes, soil dispersants such as carboxymethyl cellulose and the like can also be added. It is distinctly preferred to add stabilizers during the hydration because such a procedure permits the obtainment of an intimate and uniform association of the stabilizer with the hydrated perborate. Stabilization at the hydration stage also permits the inclusion of relatively large amounts of stabilizer which is distinctly advantageous. Much larger amounts can be effectively incorporated in this way than is possible when stabilizer is added during the preparation of sodium perborate tetrahydrate by the Carveth method. Stabilizers in amounts varying from around 0.1 to 5.0% of the weight of the hydrated product will usually be employed, the preferred amounts ranging from 0.5 to 3.0%. Much larger amounts can obviously be added if desired. Any of the well-known peroxide stabilizers can be used, such as pyrophosphates, silicates and magnesium compounds such as magnesium chloride and magnesium silicate.

Any type of agitation may be employed in the hydration operation which will effectively distribute the water and non-hydrated perborate rapidly and uniformly throughout the body of hydrated material and result in a product which is substantially uniform as to chemical composition. Tumbler type agitators can be used but those of the kneader type such as the well-known Baker-Perkin type mixer are preferred. Mixers of the cement-mixer type are also suitable. The reaction mixture goes through a somewhat sticky or viscous stage after the addition of increments so that the agitator provided should be capable of mixing such sticky products.

Products obtained by the present method are useful as laundering, bleaching and cleaning compositions, e. g., compositions for cleaning floors, paint brushes, dishes and the like. They may also be used for other purposes. They are generally superior to sodium perborate tetrahydrate and non-hydrated perborates of the type described in the above Young patent for packaging purposes.

I claim:

1. The method of hydrating and granulating non-hydrated sodium perborate comprising adding water in liquid form and said non-hydrated perborate to an agitated body of granular material comprising hydrated sodium perborate and continuing agitation of said body during the hydration reaction, said body of material being maintained throughout the operations at a temperature below the melting temperature of said hydrated perborate, said non-hydrated perborate being added in such an amount that the resulting mixture will contain not more than 25% thereof based on the weight of said hydrated perborate present, and said water being added in an amount not exceeding 150% of that amount theoretically required to hydrate the added non-hydrated perborate.

2. The method of hydrating and granulating non-hydrated sodium perborate comprising adding water in liquid form and said non-hydrated perborate to an agitated body of granular material comprising hydrated sodium perborate, the amount of said non-hydrated perborate added being such that the resulting mixture contains not more than 25% thereof based on the weight of hydrated perborate present, and the amount of said water added being at least equal to that amount required to hydrate said added non-hydrated perborate but not in excess of 150% thereof, and continuing agitation of said mixture during the hydration reaction, said body of material being maintained throughout the operations at a temperature below the melting temperature of said hydrated perborate.

3. The method of claim 2 wherein the amount of added non-hydrated perborate is such that the resulting mixture contains not more than 10% thereof.

4. The method of claim 2 carried out at a temperature not exceeding 45° C.

5. The method of claim 2 wherein the water and the non-hydrated perborate are added incrementally with periods of agitation occurring between the additions of said increments.

6. The method of claim 5 wherein the increments of water and non-hydrated perborate are added separately and each increment of non-hydrated perborate added is 1 to 10% of the weight of the body of granular material to which it is added and the temperature is 20 to 45° C.

7. The method of claim 5 wherein hydration is effected employing a 10 to 50% excess of water and the hydrated product is dried to remove free water.

8. The method of claim 7 wherein the product is dried to remove free water and 0.5 to 5% of the combined water.

9. The method of claim 5 wherein the non-hydrated perborate used contains in combined form 0.53 to 1.0 mole of $Na_2O$ and 0.5 to 2.5 atoms of active oxygen per mole of $B_2O_3$ and not more than 2 moles of water per atom of active oxygen.

10. The method of claim 5 wherein the non-hydrated perborate used contains in combined form 0.8 to 1.0 mile of $Na_2O$ and 1.8 to 2.2 atoms of active oxygen per mole of $B_2O_3$ and not more than 1.05 moles of water per atom of active oxygen.

11. The method of claim 5 wherein the granule size of the product is controlled by controlling the size of the increments and the temperature of the body of granular material to which they are added.

12. The method of claim 5 wherein a solid diluent material from the group consisting of bobax, alkali metal phosphates, soda ash, sodium sulfate, sodium silicate and mixtures thereof is also added incrementally to said body of granular material, the additions of non-hydrated perboate and said diluent material being so proportioned that the resulting product will contain from 10 to 90% of hydrated perborate and from 90 to 10% of said diluent material by weight.

13. The method of claim 5 wherein a peroxide stabilizer is also added during the hydration reaction.

14. The method of hydrating and granulating a non-hydrated sodium perborate comprising adding separately increments of water in liquid form and said perborate to an agitated body of granular material comprising sodium perborate of composition approximately that of sodium perborate tetrahydrate, the size of the increments of said non-hydrated perborate being 1 to 10% of the weight of said body of granular material to which it is added, and the size of the increments of water being 10 to 50% in excess of that amount required to hydrate completely the corresponding increments of said non-hydrated perborate, while maintaining the temperature of said body of granular material within the range 15 to 45° C., agitating said body of granular material during and between said additions and removing hydrated granular product from said body of granular material while leaving a portion thereof as the body of granular material for continued operation.

15. The method of claim 14 wherein the granule size of the product is controlled by controlling the size of the increments and the temperature of the body of granular material to which they are added.

16. The method of claim 15 wherein a solid diluent material from the group consisting of borax, alkali metal phosphates, soda ash, sodium sulfate, sodium silicate and mixtures thereof is also added incrementally to said body of granular material, the additions of non-hydrated perborate and said diluent material being so proportioned that the resulting product will contain from 10 to 90% of hydrated perborate and from 90 to 10% of said diluent material by weight.

References Cited in the file of this patent

UNITED STATES PATENTS

| | | |
|---|---|---|
| 903,967 | Fritsche | Nov. 17, 1908 |
| 975,129 | Gruter et al. | Nov. 8, 1910 |
| 999,497 | Gruter | Aug. 1, 1911 |
| 1,000,298 | Sarason | Aug. 8, 1911 |
| 1,546,156 | Welter | July 14, 1925 |
| 1,716,874 | Carveth | June 11, 1929 |
| 2,065,744 | Reichert | Dec. 29, 1936 |
| 2,257,461 | Gilbert et al. | Sept. 30, 1941 |
| 2,304,519 | Wilson | Dec. 8, 1942 |
| 2,308,992 | Mertens | Jan. 19, 1943 |
| 2,362,401 | Reichert et al. | Nov. 7, 1944 |
| 2,414,969 | Moose | Jan. 28, 1947 |
| 2,477,492 | Moose | July 26, 1949 |
| 2,491,789 | Young | Dec. 20, 1949 |

FOREIGN PATENTS

| | | |
|---|---|---|
| 481,399 | Great Britain | Mar. 10, 1938 |

OTHER REFERENCES

Mellor: "Comprehensive Treatise on Inorganic and Theoretical Chemistry," vol. 5 (1924), pages 117–119.